US007190949B2

(12) United States Patent
Tsuda et al.

(10) Patent No.: US 7,190,949 B2
(45) Date of Patent: Mar. 13, 2007

(54) MOBILE COMMUNICATION TERMINAL, APPLICATION SOFTWARE INITIATING APPARATUS, APPLICATION SOFTWARE INITIATING SYSTEM, APPLICATION SOFTWARE INITIATING METHOD, AND APPLICATION SOFTWARE INITIATING PROGRAM

(75) Inventors: Masayuki Tsuda, Tokyo (JP); Takefumi Naganuma, Kyoto (JP); Hideyuki Nagasawa, Kanagawa (JP); Eriko Oseki, Kanagawa (JP); Fukiko Maeda, Kanagawa (JP); Nobuyuki Watanabe, Saitama (JP); Tatsuro Oi, Kanagawa (JP); Takashi Kondo, Tokyo (JP); Kazuhiro Yamada, Kanagawa (JP); Dai Kamiya, Chiba (JP)

(73) Assignee: NTT DoCoMo, Inc., Tokyo (JP)

( * ) Notice: Subject to any disclaimer, the term of this patent is extended or adjusted under 35 U.S.C. 154(b) by 103 days.

(21) Appl. No.: 10/497,389

(22) PCT Filed: Dec. 5, 2002

(86) PCT No.: PCT/JP02/12771

§ 371 (c)(1),
(2), (4) Date: Nov. 12, 2004

(87) PCT Pub. No.: WO03/048926

PCT Pub. Date: Jun. 12, 2003

(65) Prior Publication Data

US 2005/0107076 A1    May 19, 2005

(30) Foreign Application Priority Data

Dec. 7, 2001   (JP)   .............................. 2001-374611

(51) Int. Cl.
*H04M 3/16* (2006.01)
(52) U.S. Cl. ...................... 455/411; 455/410; 455/418; 713/201; 713/200
(58) Field of Classification Search ............. 455/412.1, 455/412.2, 418, 419, 414.2, 411, 410; 713/201, 713/200
See application file for complete search history.

(56) References Cited

U.S. PATENT DOCUMENTS 5,483,658 A * 1/1996 Grube et al. .................. 726/29
5,553,314 A * 9/1996 Grube et al. ................. 455/514
5,724,655 A * 3/1998 Grube et al. ................. 455/419

(Continued)

FOREIGN PATENT DOCUMENTS

CN          1257372 A        6/2000

(Continued)

*Primary Examiner*—Danh Cong Le
(74) *Attorney, Agent, or Firm*—Oblon, Spivak, McClelland, Maier & Neustadt, P.C.

(57) ABSTRACT

The mobile telephone 1 pertaining to the present invention comprises a memory unit 6, a short-range wireless unit 8, and a control unit 2. The memory unit 6 associates and stores an application ID, keyword, and application software. The short-range wireless unit 8 receives an application ID and keyword transmitted from outside. The control unit 2 retrieves from the application storage area 62 and starts application software that corresponds to the received application ID when there is a match between the keyword received by the short-range wireless unit 8 and the keyword stored in the ADF storage area 61.

14 Claims, 10 Drawing Sheets

U.S. PATENT DOCUMENTS

| | | |
|---|---|---|
| 6,577,861 B2 | 6/2003 | Ogasawara |
| 6,628,938 B1 * | 9/2003 | Rachabathuni et al. .. 455/456.3 |
| 6,633,759 B1 | 10/2003 | Kobayashi |
| 2002/0160805 A1 * | 10/2002 | Laitinen et al. ............. 455/550 |

FOREIGN PATENT DOCUMENTS

| | | |
|---|---|---|
| GB | 2 357 011 A | 6/2001 |
| JP | 02-165290 | 6/1990 |
| JP | 2-165290 | 6/1990 |
| JP | 9-331579 | 12/1997 |
| JP | 10-97420 | 4/1998 |
| JP | 10-097420 | 4/1998 |
| JP | 11-212894 | 8/1999 |
| JP | 2000-105690 | 4/2000 |
| JP | 2000-112729 | 4/2000 |
| JP | 2000-349702 | 12/2000 |
| JP | 2001-103568 | 4/2001 |
| JP | 2001-216543 | 8/2001 |
| JP | 2001-273135 | 10/2001 |
| WO | WO 00/40049 | 7/2000 |

\* cited by examiner

MOBILE COMMUNICATION TERMINAL, APPLICATION SOFTWARE INITIATING APPARATUS, APPLICATION SOFTWARE INITIATING SYSTEM, APPLICATION SOFTWARE INITIATING METHOD, AND APPLICATION SOFTWARE INITIATING PROGRAM

TECHNICAL FIELD

The present invention relates to a mobile communication terminal, application software starting device, application software starting system, application software starting method, and application starting program.

BACKGROUND ART

Accompanying recent progress in wireless communication technology, mobile communication terminals have been developed which are capable of downloading application software from a network such as the Internet. Examples of such application software include software used for viewing stock price charts, map software, action games, and the like.

DISCLOSURE OF THE INVENTION

However, the conventional techniques described above have had the following drawbacks. Specifically, the operating buttons and operating methods used for starting application software in the mobile communication terminals often differ between various makers and machine models. Mobile communication terminals are also more compact and have smaller display screens than personal computers and other information devices to allow for portability and carryability. Therefore, the selection and execution of the desired application software from a plurality of application software is not necessarily easy for the user to perform. This is particularly inconvenient in cases of outdoor use when rapid selection is required.

The present invention was devised with the foregoing problems in view, and is aimed at providing a mobile communication terminal, application software starting device, application software starting system, application software starting method, and application starting program capable of executing the desired application software quickly and easily.

The mobile communication terminal pertaining to the present invention is a mobile communication terminal for communicating with an application software starting device, and is characterized in comprising storing means for storing application software in association with identification information; receiving means for receiving identification information transmitted from the application software starting device; and starting means for retrieving from the storing means and starting application software that corresponds to identification information received by the receiving means.

The application software starting device pertaining to the present invention is an application software starting device for communicating with the mobile communication terminal, and is characterized in comprising identification information storing means for storing identification information for application software that is executable by the mobile communication terminal, and transmitting means for transmitting identification information stored in the identification information storing means to the mobile communication terminal.

The application software starting method pertaining to the present invention is an application software starting method in a mobile communication terminal for communicating with an application software starting device, and is characterized in comprising a storing step in which the mobile communication terminal stores application software in association with identification information in a storing means; a transmitting step in which the application software starting device transmits identification information for application software relating to the application software starting device to the mobile communication terminal; a receiving step in which the mobile communication terminal receives the identification information transmitted in the transmitting step; and a starting step in which the mobile communication terminal retrieves from the storing means and starts application software that corresponds to identification information received in the receiving step.

The application software starting program pertaining to the present invention executes, in a mobile communication terminal for communicating with an application software starting device, a storage routine for storing application software in association with identification information in a storing means; a transmission routine for transmitting identification information for application software relating to the application software starting device to the mobile communication terminal; a receiving routine for receiving identification information thus transmitted; and a starting routine for retrieving from the storing means and starting application software that corresponds to identification information thus received.

By means of these inventions, a mobile communication terminal receives identification information for application software from an application software starting device and automatically starts (push starts) application software that corresponds to that identification information. Consequently, the need is eliminated for the user of the mobile communication terminal to manually select the application software used. As a result, the desired application software can be executed easily and quickly.

In preferred practice, the storing means in the mobile communication terminal stores authentication information used in the external startup of the application software in association with identification information for the application software; the receiving means receives identification information transmitted from the application software starting device and further comprises determining means for determining the identity between authentication information stored in the storing means and authentication information received by means of the receiving means; and the starting means retrieves from the storing means and starts application software that corresponds to identification information received by the receiving means when it is determined by the determining means that there is identity between the authentication information stored in the storing means and the authentication information received by the receiving means.

It is also preferable that the identification information storing means in the application software starting device stores authentication information in association with the identification information, and that the transmitting means transmits the authentication information stored in the identification information storing means to the mobile communication terminal.

It is further preferable in the application software starting method that authentication information used in the startup of the application software is stored in the storing means in association with identification information for application software in the storing step; authentication information is transmitted to the mobile communication terminal in the transmitting step; authentication information transmitted in the transmitting step is received in the receiving step; a determining step is further provided for determining the identity of authentication information stored in the storing step with authentication information received in the receiving step; and application software that corresponds to the identification information received in the receiving step is retrieved from the storing means and started in the starting step when it is determined in the determining step that the authentication information stored in the storing step is identical to the authentication information received in the receiving step.

By means of these inventions, a mobile communication terminal receives identification information and authentication information for application software from an application software starting device, and automatically starts application software that corresponds to identification information only when there is a match with the authentication information. Authentication functionality can thus be provided to the external startup of application software.

Furthermore, it is preferable for the storing means in the mobile communication terminal to store the authentication information in an invisible state.

Moreover, it is preferable to store the authentication information in the storing means in an invisible state in the storing step of the application software starting method.

Because the authentication information is stored in an invisible state by means of these inventions, there is minimal danger of the information being stolen or modified by a third party. Authentication functionality provided to the external startup of application software can thus be enhanced.

It is also preferable that the mobile communication terminal further comprise setting means for setting the external startup of the application software to be permitted or not permitted, such that the starting means retrieves from the storing means and starts application software that corresponds to identification information received from the receiving means when the external startup of the application software is set to be permitted by the setting means.

It is also preferable that the application software starting method further comprise a setting step in which the external startup of application software is set to be permitted or not permitted for the mobile communication terminal, and application software that corresponds to identification information received in the receiving step is retrieved from the storing means and started in the starting step when external startup of the application software is set to be permitted in the setting step.

By means of these inventions, application software is started only when the startup of application software is set to be permitted. Application software for which the user does not desire external startup is therefore prevented from being automatically started against the user's wishes.

Furthermore, it is preferable that the mobile communication terminal further comprise notifying means for notifying the user of the mobile communication terminal that external startup of the application software has been set to be not permitted in the case in which external startup of the application software is set to be not permitted when identification information is received by the receiving means.

Furthermore, it is preferable that the application software starting method further comprise a notifying step in which the mobile communication terminal notifies the user that external startup of the application software has been set to be not permitted in the case in which external startup of the application software is set to be not permitted when identification information is received in the receiving step.

By means of these inventions, in the case in which external startup of application software is set to be not permitted, notification of that fact is issued when the mobile communication terminal receives the identification information. A function whereby the application software is started externally can thus be utilized even when the user has forgotten to set the external startup to be permitted. The function whereby the application software is started externally can also be utilized even when the user is not aware of the fact itself that application software capable of external startup has been stored.

It is also preferable that the mobile communication terminal further comprise application software receiving means for receiving the identification information and application software from a server device, and that the storing means store identification information received by the application software receiving means in association with application software.

It is also preferable that the application software starting method further comprise an application software receiving step in which the mobile communication terminal receives the identification information and the application software from an external server device; with the identification information and application software received in the application software receiving step being coordinated and stored in the storing step.

By means of these inventions, a mobile communication terminal receives and stores identification information and application software from an external server device. Consequently, the heretofore described inventions can apply not only to application software stored in advance in the storing means, but also to application software that is downloaded from an external server device.

Furthermore, a system configured with the aforementioned mobile communication terminal and application software starting device provided thereto may be constructed/operated as an application software starting system for performing communication between the mobile communication terminal and the application software starting device.

Furthermore, the application software starting device pertaining to the present invention may further comprise notifying means for issuing notification when it is detected that the application software has not been stored in the storing means of the mobile communication terminal.

By means of the present invention, the user of a mobile communication terminal can easily know when application software that corresponds to an application software starting device is not stored in the mobile communication terminal. It therefore becomes possible to evaluate whether or not to acquire application software.

BEST MODES FOR CARRYING OUT THE INVENTION (First Embodiment)

The first embodiment of the present invention will hereafter be described with reference to the accompanying diagrams. "Application" is used in the following description as an abbreviation for "application software."

Figure 1:
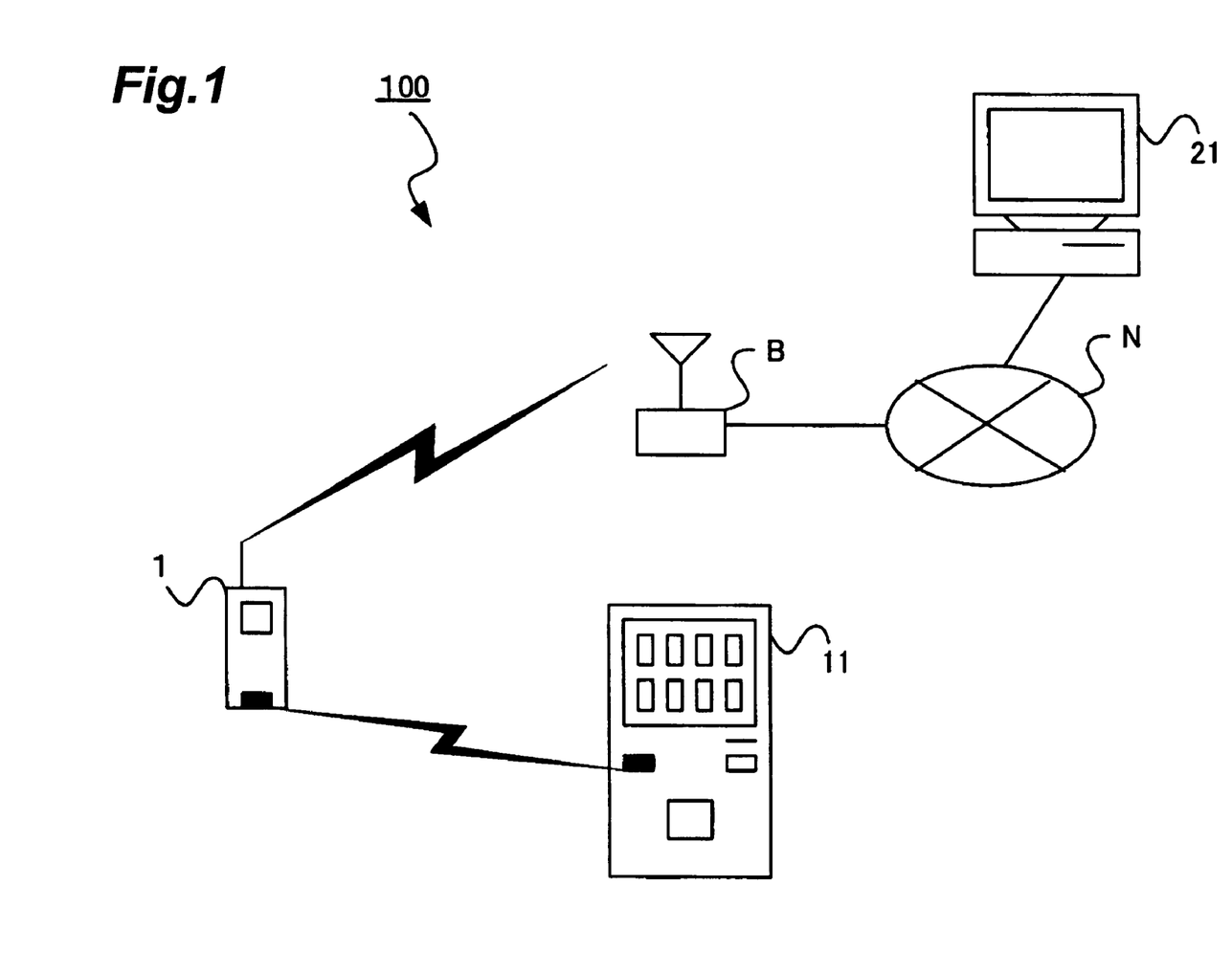
FIG. 1 is a frame format diagram depicting an example of the overall configuration of the application starting system.

A description of the structure will first be given. FIG. 1 is a frame format diagram depicting an example of the overall configuration of the application starting system 100 according to the present embodiment. As depicted in FIG. 1, the application starting system 100 comprises a mobile telephone 1 (corresponding to a mobile communication terminal), an automatic vending machine 11 (corresponding to an application software starting device), and an application providing server 21 (corresponding to a server device). The mobile telephone 1 is capable of short-range wireless communication with the automatic vending machine 11 using infrared rays. The mobile telephone 1 is also connected to a packet communication network N via a base transceiver station B. Furthermore, the application providing server 21 is connected by wire to the packet communication network N.

Figure 2:
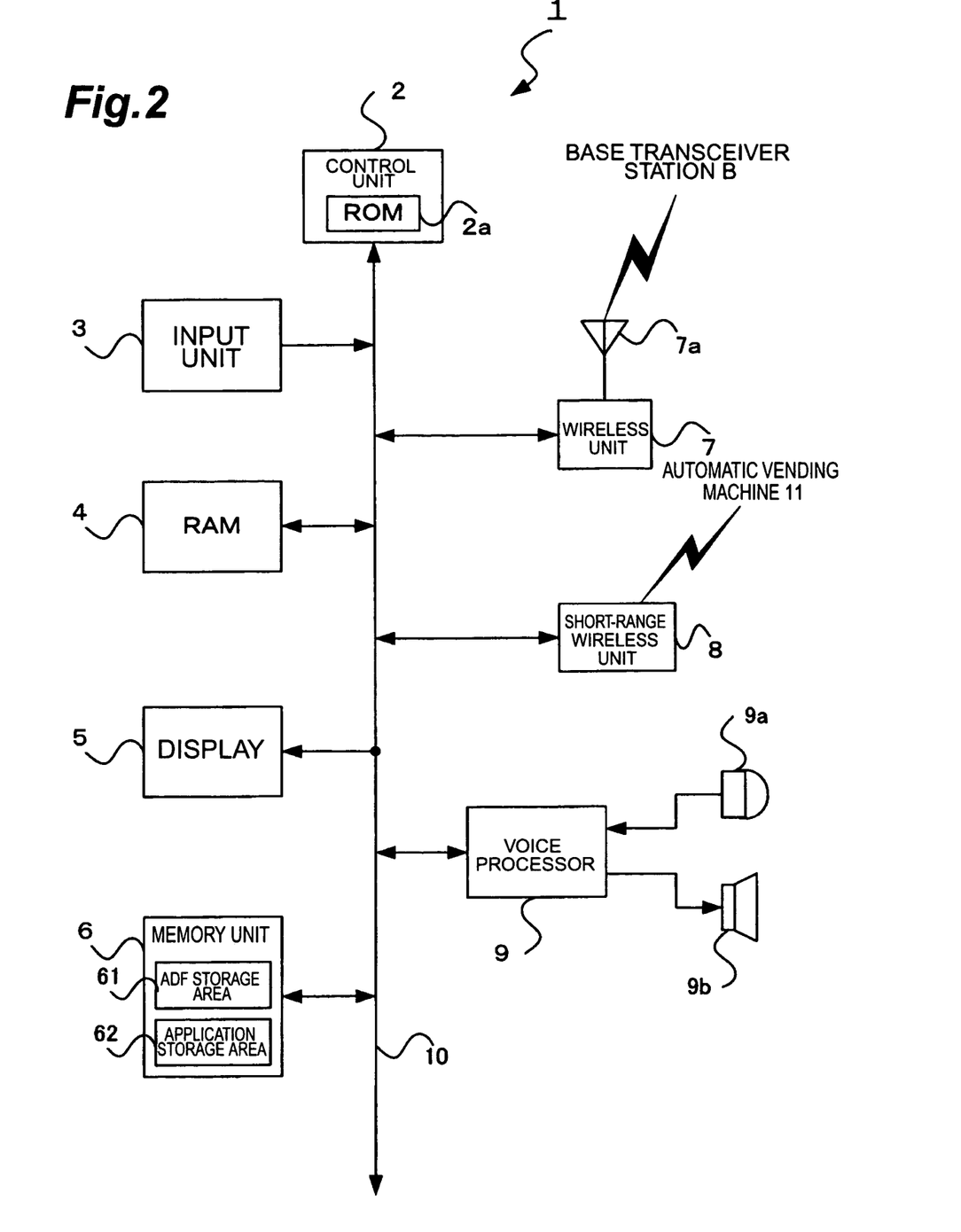
FIG. 2 is a block diagram depicting the functional configuration of the mobile telephone.

The internal structure of the mobile telephone 1 will hereafter be described in detail with reference to FIG. 2. FIG. 2 is a block diagram depicting the functional configuration of the mobile telephone 1. As depicted in FIG. 2, the mobile telephone 1 comprises a control unit 2 (corresponding to starting means and setting means), input unit 3, RAM 4, display 5 (corresponding to notifying means), memory unit 6 (corresponding to storing means), wireless unit 7, short-range wireless unit 8 (corresponds to receiving means), and voice processor 9; and these elements are connected via a bus 10 to enable the input and output of various signals.

The control unit 2 contains ROM (Read Only Memory) 2a, retrieves a program stored in advance in the ROM 2a and deploys it to the RAM 4, and centrally controls each element according to the program. Specifically, the control unit 2 executes the hereinafter described mobile telephone application startup routine (see FIG. 6) according to the input signal from the input unit 3 and the program deployed to the RAM 4; and the results of that routine are temporarily stored in the RAM 4 and displayed on the display 5. The results of the routine, which are stored in the RAM 4, are also stored in a prescribed area within the memory unit 6 as needed.

The input unit 3 is provided with a setting button for permitting/not permitting application startup, and various operating buttons for directing power ON/OFF; function selection, and the like; and these operating buttons output input signals to the control unit 2 according to instruction specifics by being pushed independently or in combination.

The RAM (Random Access Memory) 4 comprises semiconductors or the like, and temporarily stores programs retrieved from the ROM 2a and data retrieved from the memory unit 6 in the various routines executed by the control unit 2. The RAM 4 also has VRAM (Video RAM) functionality for temporarily storing data displayed on the display 5.

The display 5 is composed of an LCD (Liquid Crystal Display), EL (Electro Luminescence), or the like, and displays display data on a screen according to display signals that are input from the control unit 2.

The memory unit 6 is composed of EEPROM (Electrically Erasable and Programmable ROM) or other nonvolatile semiconductor memory, and stores data necessary for the control unit 2 to execute various routines, data generated as a result of such execution, and the like. For example, the memory unit 6 forms an ADF storage area 61 and an application storage area 62 during execution of the hereafter described mobile telephone application startup routine.

Figure 3:
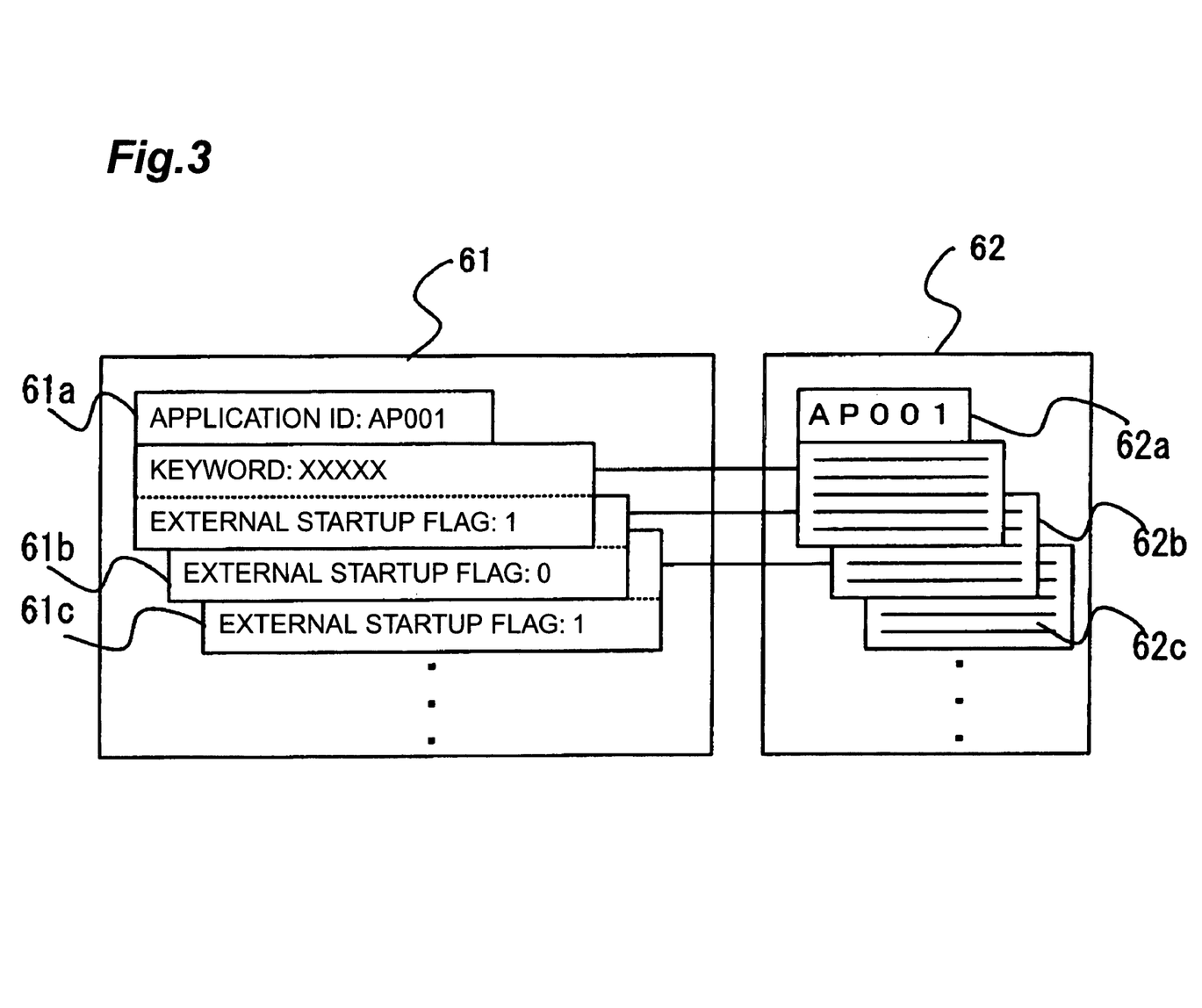
FIG. 3 is a diagram depicting an example of data storage in the ADF storage area and application storage area.

The ADF storage area 61 is a data area for storing a file composed of data relating to attributes of application software executable by the mobile telephone 1 as an ADF (Attribute Definition File). An example of data storage in the ADF storage area 61 will be described hereafter with reference to FIG. 3. As depicted in FIG. 3, a plurality of ADF 61a, 61b, 61c, etc. provided at least with an application ID, keyword, and external startup flag are stored in the ADF storage area 61.

The application ID is defined as uniquely allocated data (for example, "AP001," "AP002," "AP003," etc.) for identifying application software. The application ID may consist not only of symbolic data, but also of alphabetical data or the like for displaying the title of application software, insofar as the application software to be started can thus be identified. This may also be a URL (Uniform Resource Locator) or the like of a Web page as a download source when application software is downloaded for use from the application providing server 21.

The keyword is defined as authenticating information that is specific to application software and is needed for starting the application software. To provide against theft or modification, the keyword is stored in an externally invisible state or an encrypted state that is difficult to decipher.

The external startup flag is defined as a flag in which the permission for external startup is indicated with binary numerical data "1" or "0." External startup is defined as the mobile telephone 1 automatically starting (push starting) application software according to a startup request transmitted from the automatic vending machine 11 or other application software starting device. An external startup flag value of "1" indicates that external startup is enabled, and "0" indicates that external startup is not permitted.

The application storage area 62 is a program area for storing application software that is executable by the mobile telephone 1. As depicted in FIG. 3, application software 62a, 62b, 62c, etc. are stored in association with the aforementioned application ID. The application software 62a, 62b, 62c, etc. are therefore stored in association with an ADF 61a, 61b, 61c, etc. by means of the application ID. Examples of such application software include specialized programs by which the mobile telephone 1 can communicate with the automatic vending machine 11 and purchase merchandise and the like.

To simplify description, the data comprising the application ID, keyword, and external startup flag are shown as being stored in the same storage area (ADF storage area 61), but if a storage embodiment is adopted wherein the data are retrievably coordinated, they need not necessarily be stored in the same storage area.

Again in FIG. 2, the wireless unit 7 comprises a circuit having a modem unit (not shown) for performing modulation/demodulation of signals, and a coding/decoding unit (not shown) for performing coding/decoding of signals; and is provided with an antenna 7a. The antenna 7a is telescopically mounted on the upper part of the mobile telephone 1 casing, and is designed to transmit and receive data from the base transceiver station B.

When transmissions are received, the modem unit performs a demodulating routine on the signal input from the antenna 7a to produce a signal that can be processed by the coding/decoding unit. When transmissions are sent, a routine is also performed to modulate the digital signal converted in the coding/decoding unit into a signal that can be wirelessly transmitted. The coding/decoding unit is configured according to a codec (CODEC) and is designed to perform processing (demodulation) to convert the digital signal input from the modem unit into an analog signal when transmissions are received. When transmissions are sent, processing (encryption) is also performed for converting a voice signal or other analog signal into a digital signal, and the converted digital signal is compressed into a quantity of data suitable for transmission.

The short-range wireless unit 8 comprises an infrared communication unit which conforms to IrDA (Infrared Data Association) specifications. The transmittable distance thereof is within a radius of approximately 1 m. Specifically, the short-range wireless unit 8 exists within a radius of 1 m and exchanges data with a device having the same infrared communication capability. The short-range wireless unit 8 initiates or suspends electric current based on the input signal from the control unit 2.

The voice processor 9 comprises a converter, amplifier, or the like, and is provided with a microphone 9a and speaker 9b. During a call, the voice processor 9 converts the voice data input from the control unit 2 into analog signals in the converter, and drives the speaker 9b via the amplifier. During a call, the voice processor 9 also converts the voice signal input from the microphone 9a into a wirelessly transmittable digital signal by means of the converter, and outputs the result to the wireless unit 7.

Figure 4:
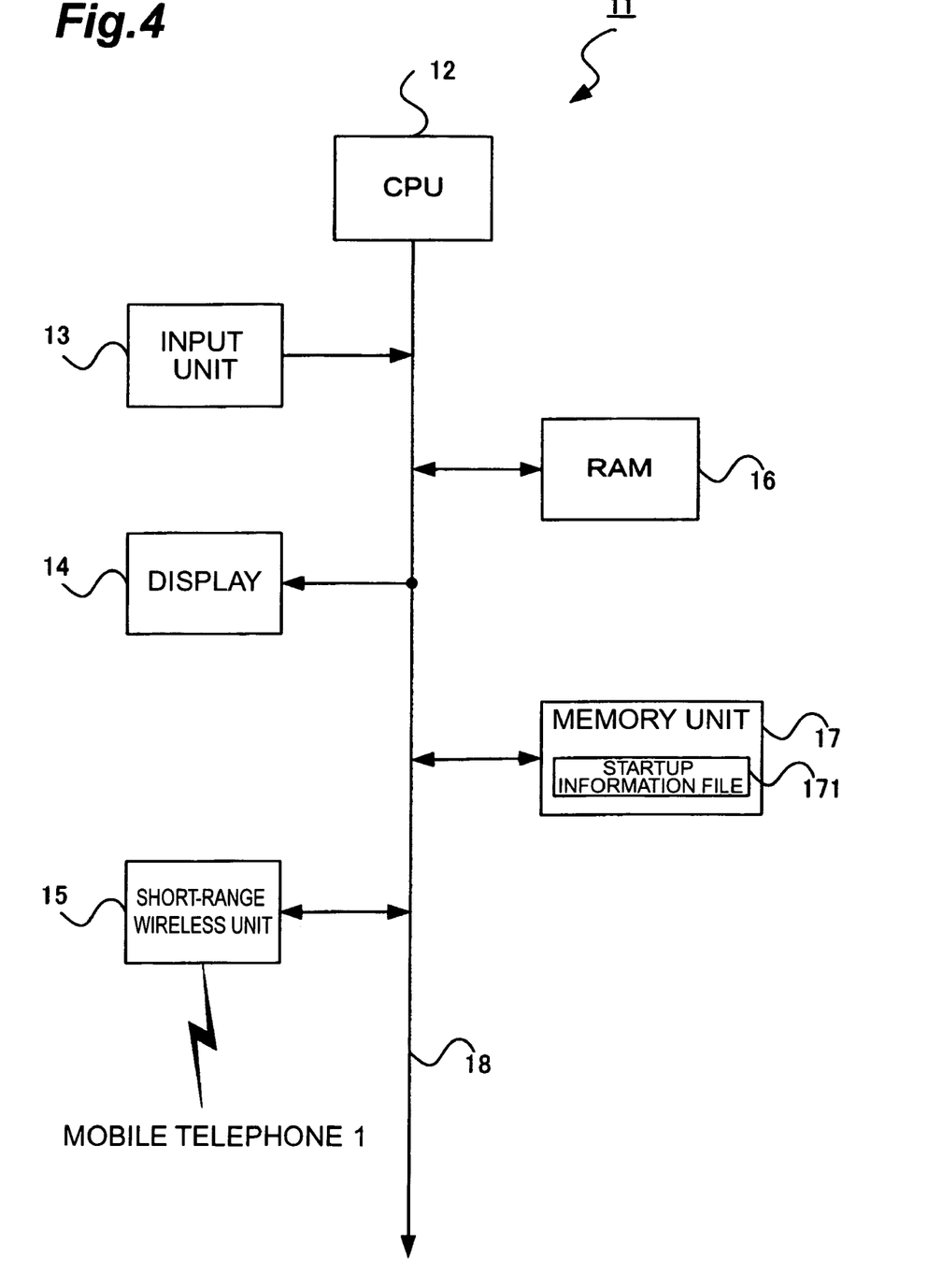
FIG. 4 is a block diagram depicting the functional configuration of the automatic vending machine.

The internal configuration of the automatic vending machine 11 will next be described with reference to FIG. 4. FIG. 4 is a block diagram depicting the functional configuration of the automatic vending machine 11. As depicted in FIG. 4, the automatic vending machine 11 comprises a CPU 12, input unit 13, display 14 (corresponds to notifying means), short-range wireless unit 15 (corresponds to transmitting means), RAM 16, and memory unit 17 (corresponds to identification information storing means), with each of the elements representing an external device connected by a bus 18.

The CPU (Central Processing Unit) 12 retrieves various programs stored in the memory unit 17 and deploys them to the RAM 16, and centrally controls the operation of each element according to the program. The CPU 12 also executes the hereinafter described automatic vending machine application startup routine (see FIG. 7) according to the program deployed to the RAM 16; and the results of that routine are stored in the RAM 16 and displayed on the display 14. The results of the routine, which are stored in the RAM 16, are then retained in a prescribed retention location in the memory unit 17.

The input unit 13 is provided with a merchandise selection button, a return button, and the like, and outputs operating signals from manually depressed buttons as input signals to the CPU 12.

The display 14 comprises an LCD (Liquid Crystal Display) or CRT (Cathode Ray Tube), and displays the merchandise name, merchandise price, amount of money inserted, and the like on the screen according to the display signal instructions that are input from the CPU 12.

The short-range wireless unit 15 comprises an infrared communication unit which conforms to IrDA (Infrared Data Association) specifications. The transmittable distance thereof is within a radius of approximately 1 m. Specifically, the short-range wireless unit 15 exists within a radius of 1 m, and exchanges data with a device having the same infrared communication capability.

The RAM (Random Access Memory) 16 forms a temporary storage area for the various programs executable in the automatic vending machine 11, input and output data, parameters, and other types of data retrieved from the memory unit 17 for the various routines executed and controlled by the CPU 12.

Figure 5:
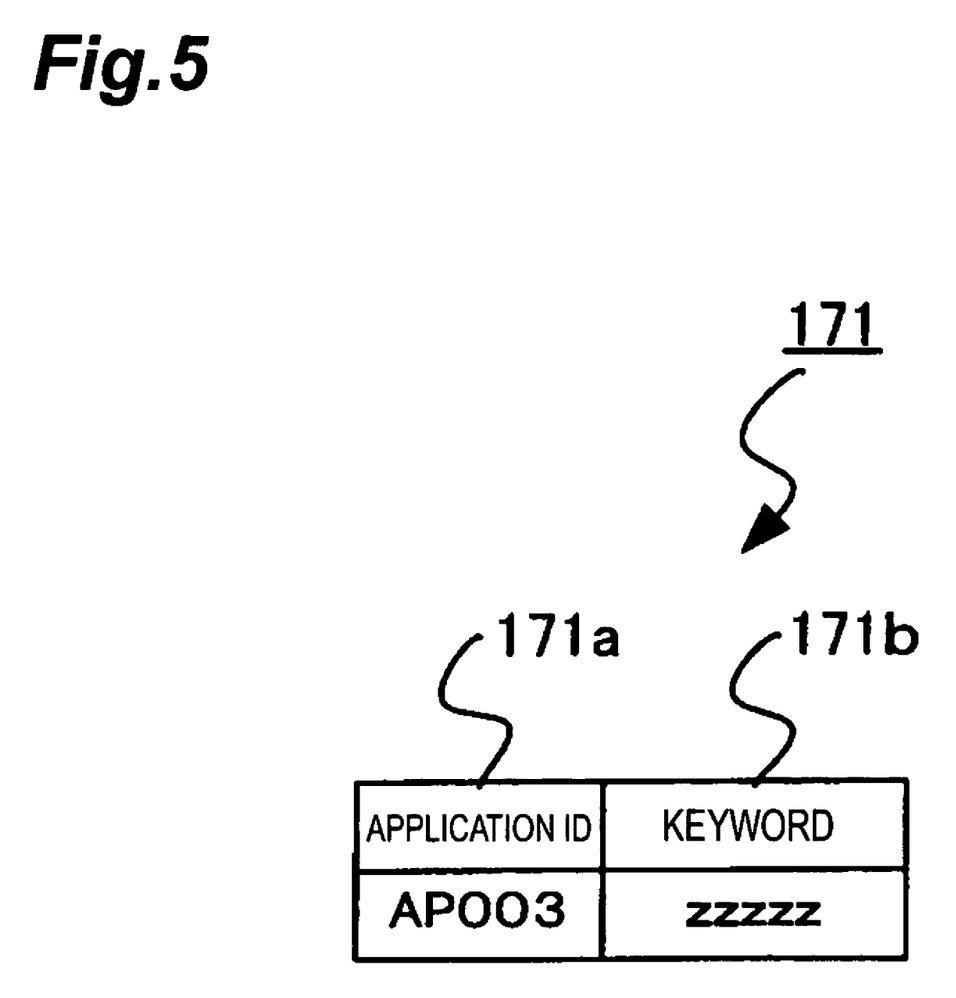
FIG. 5 is a diagram depicting an example of data storage in the startup information file.

The memory unit 17 stores programs that are necessary for execution of the hereinafter described application startup routine. The memory unit 17 has at least the hereinafter described startup information file 171, as depicted in FIG. 5. Examples of data storage in each table are described in detail hereafter with reference to FIG. 5.

In FIG. 5, the startup information file 171 is provided at least with an application ID storage area 171a and a keyword storage area 171b. The application ID storage area 171a stores uniquely allocated data ("AP003," for example) as an "application ID" for identifying application software. The application ID is used to specify application software when a user purchases merchandise with the automatic vending machine 11. The keyword storage area 171b stores data ("zzzzz," for example) that are specific to the application software and are needed as a "keyword" during application software startup. To provide against theft or modification, the keyword is stored in an externally invisible state or an encrypted state that is difficult to decipher. Examples of such application software include specialized programs by which the mobile telephone 1 can communicate with the automatic vending machine 11 and purchase merchandise and the like.

The operation of the mobile telephone 1 according to the present embodiment will next be described with reference to FIG. 6. The steps comprising the application software startup method pertaining to the present invention will also be described.

Figure 6:
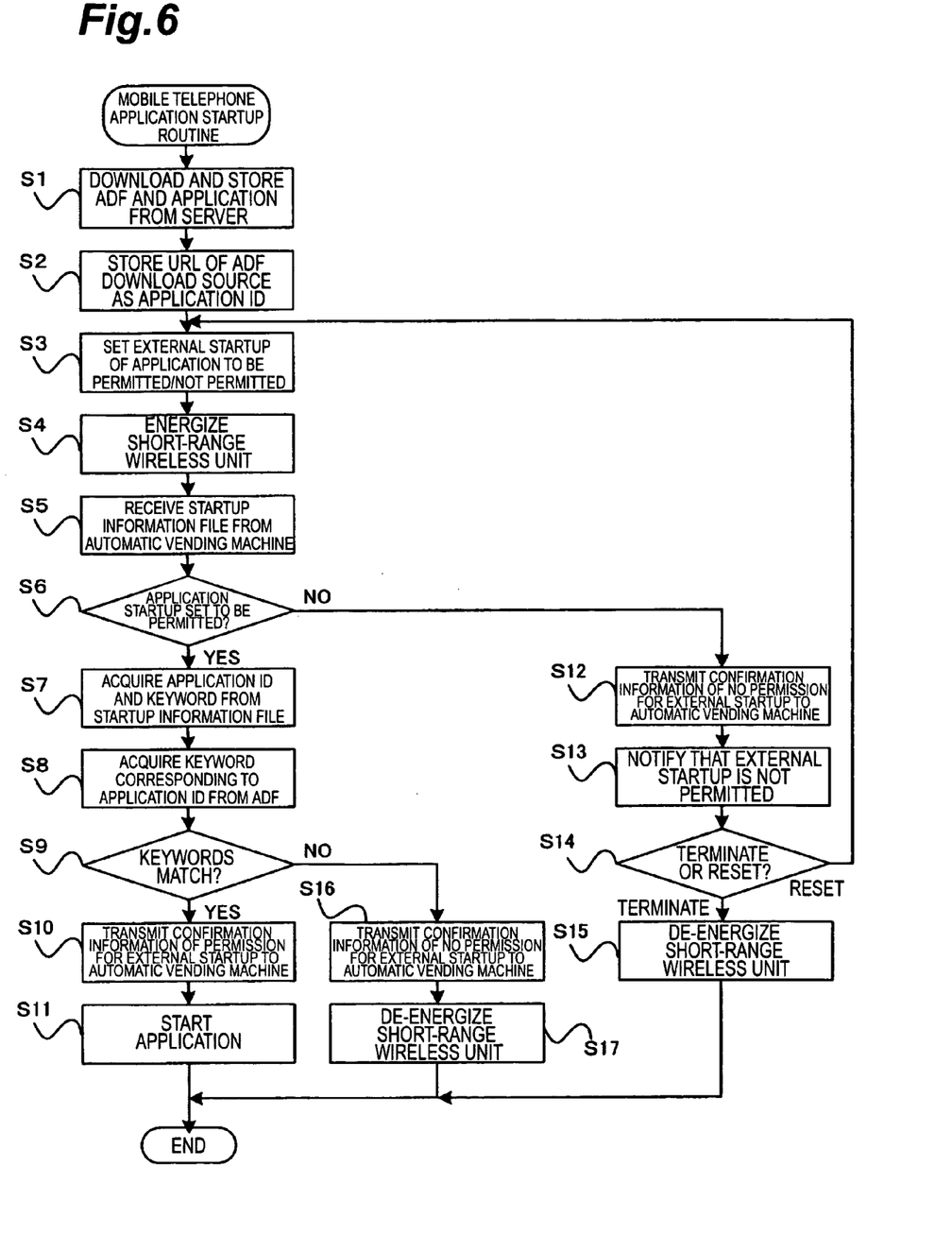
FIG. 6 is a flowchart describing the mobile telephone application startup routine according to the first embodiment.

FIG. 6 is a flowchart for describing the mobile telephone application startup routine. First of all in S1, the mobile telephone 1 downloads the ADF and application software from the application providing server 21. The ADF thus downloaded is stored in the ADF storage area 61, and the application software is stored in the application storage area 62.

Next in S2, the mobile telephone 1 acquires the download source URL for the ADF and application software by means of the wireless unit 7. The URL thus acquired is stored as an application ID in the application ID storage area.

In S3, the control-unit 2 sets the external startup of the application software to be permitted or not permitted based on input instructions from the user. Specifically, the control unit 2 stores a "1" in the external startup flag unit corresponding to the aforementioned application ID in the ADF storage area 61 when external startup is set to be permitted. Also, the control unit 2 stores a "0" in the external startup flag unit corresponding to the aforementioned application ID in the ADF storage area 61 when external startup is set to be not permitted. In other words, external startup of application software occurs only when the external startup flag stored in the external startup flag unit is "1." By this means, application software for which the user does not desire external startup is prevented from being automatically started against the user's wishes.

In S4, the control unit 2 initiates an electric current to the short-range wireless unit 8 in accordance with the setting of the external startup flag. As a result, the short-range wireless unit 8 is capable of wireless communication with the short-range wireless unit 15 of the automatic vending machine 11. Because the startup information file is transmitted as needed from the short-range wireless unit 15, the short-range wireless unit 8 receives the startup information file thus transmitted (S5). Receiving of the startup information file is performed automatically when the mobile telephone 1 is located within the transmission range (within 1 m, for example) of the short-range wireless unit 15.

Next in S6, the control unit 2 reads the external startup flag corresponding to the application ID to the RAM 4 on the basis of the application ID in the startup information file when receipt of the startup information file by the short-range wireless unit 8 is detected. When the external startup flag thus read is "1" (S6; YES), the control unit 2 determines that external startup of the application software is set to be permitted, and proceeds to S7 and subsequent routines.

In S7, the control unit 2 acquires an application ID and keyword from the startup information file received in S5. Then, from the keyword storage unit in the ADF storage area 61, the control unit 2 acquires the keyword corresponding to the application ID thus received (S8).

In the following S9, the control unit 2 evaluates whether the keyword acquired from the startup information file in S7 matches the keyword acquired from the keyword storage unit in S8 (specifically, the keyword contained in the ADF). By means of this evaluation, a function can be accomplished by which the external startup of application software is authenticated.

As a result of the evaluation, the control unit 2 transmits authentication information to the automatic vending machine 11 (S10) by means of the short-range wireless unit 8 when the aforementioned keywords match (S9; YES). The authentication information comprises information with which the mobile telephone 1 notifies the automatic vending machine 11 whether or not external startup of application software is permitted. Specifically, the automatic vending machine 11 determines based on this authentication information whether to continue or suspend transmission of the startup information file to the mobile telephone 1. After transmission of the authentication information, the control unit 2 retrieves from the application storage area 62 and starts (S11) the application software for which the keywords matched in S9.

On the other hand, when the external startup flag thus read in S6 is "0" (S6; NO), the control unit 2 determines that external startup of the application software is set to be not permitted, and proceeds to S12 and subsequent routines. In S12, the control unit 2 transmits the authentication information to the automatic vending machine 11 by means of the short-range wireless unit 8. The mobile telephone 1, according the this authentication information, notifies the automatic vending machine 11 that external startup of the application software is not permitted.

In S13, the control unit 2 notifies the user that external startup of the application software is set to be not permitted. The method for issuing notification that external startup is not permitted may comprise a visual display on the display 5, issuing sounds from the speaker 9b, or any other means. By this notification, the function whereby the application software is started externally can be utilized even when the user has forgotten to set the external startup of the application software to be permitted, or the fact itself that application software capable of external startup has been stored.

Next in S14, the control unit 2 selects a routine consisting of either termination of the application startup routine or resetting of permission for external startup on the basis of input instructions from the user. The control unit 2 suspends (S15) the electric current of the short-range wireless unit 8 initiated in S2 when termination of the application startup routine is selected (S14; terminate). As a result, the short-range wireless unit 8 suspends transmission of the startup information file from the automatic vending machine 11. The mobile telephone 1 also terminates the sequential mobile telephone application startup routine. Also, when resetting of permission for external startup is selected in S14 (S14; reset), the process returns to S3, and execution of S3 and subsequent routines continues.

As a result of the evaluation in S9, the control unit 2 transmits authentication information to the automatic vending machine 11 by means of the short-range wireless unit 8 (S16) when the keyword contained in the startup information file matches the keyword contained in the ADF (S9; NO). This authentication information is for notifying the automatic vending machine 11 that external startup of the application software is not permitted.

In the final S17, the control unit 2 suspends the electric current of the short-range wireless unit 8 initiated in S2. As a result, the short-range wireless unit 8 terminates the receipt of the startup information file from the automatic vending machine 11. The mobile telephone 1 then terminates the sequential mobile telephone application startup routine.

Figure 7:
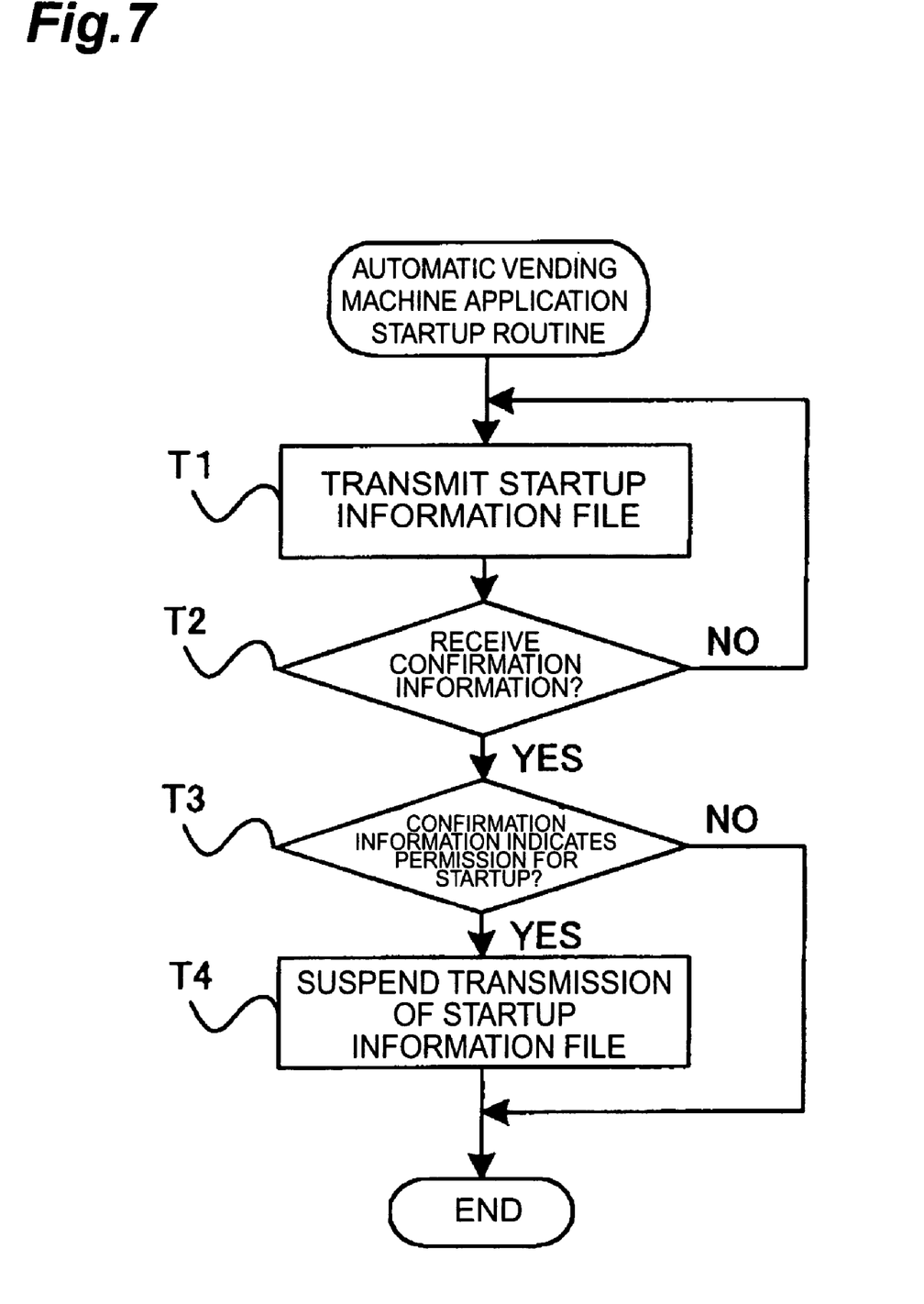
FIG. 7 is a flowchart describing the automatic vending machine application software startup routine according to the first embodiment.

The operation of the automatic vending machine 11 according to the present embodiment will next be described with reference to FIG. 7. FIG. 7 is a flowchart for describing the automatic vending machine application software startup routine. The automatic vending machine application software startup routine is executed in association with the mobile telephone application startup routine.

First of all in T1, the automatic vending machine 11 transmits the startup information file 171 to the mobile telephone 1 by means of the short-range wireless unit 15. After transmission, the automatic vending machine 11 operates in standby for receipt of the authentication information by means of the short-range wireless unit 15 (T2). When the authentication information is received (T2; YES), the CPU 12 determines whether external startup of the application software is permitted based on the authentication information thus received (T3). The CPU 12 otherwise continues transmission (T1) of the startup information file 171 as long as the authentication information is not received (T2; NO).

When external startup of the application software is permitted according to the results of the evaluation in T3 (T3; YES), the automatic vending machine 11 suspends transmission by means of the short-range wireless unit 15 of the startup information file (T4). In contrast, the sequential automatic vending machine application startup routine is terminated when external startup of the application software is not permitted (T3; NO). Also, the CPU 12 restarts the transmission routine of the startup information file 171 (T1) when a mobile telephone other than the mobile telephone 1 is placed within the wireless transmission range of the automatic vending machine 11.

As heretofore described, by means of the application starting system 100 of the present embodiment, the mobile telephone 1 coordinates and stores the application software received from the application providing server 21 with the ADF in the memory unit 6. The application ID, keyword, and external startup flag are contained in the ADF. The mobile telephone 1 receives the startup information file transmitted from the automatic vending machine 11. The application ID and keyword are contained in the startup information file. The mobile telephone 1 starts the application software when the external startup flag in the ADF is "1" and there is a match between the keywords in the ADF and startup information file. Consequently, it becomes unnecessary for the user to manually select application software that corresponds to the automatic vending machine 11. As a result, the desired application software can be executed easily and quickly.

(Second Embodiment)

The second embodiment of the present invention will next be described with reference to the figures. For the application starting system 100 according to the first embodiment, application startup was described with the assumption that an application corresponding to the automatic vending machine 11 was contained in advance in the mobile telephone 1. However, if the mobile telephone is transferred to within the wireless communication range of the automatic vending machine, an application corresponding to that automatic vending machine need not necessarily be contained therein. In view of this, a case in which the mobile telephone 1 does not contain such an application will be considered as an example in the present embodiment, and the routines used for the portable telephone and automatic vending machine in this case will be described.

Because the structure of the application startup system according to the present embodiment is identical to the structure of the application starting system 100 described in detail in the first embodiment, the same symbols are used for the constituent elements thereof, and their description is omitted.

Figure 8:
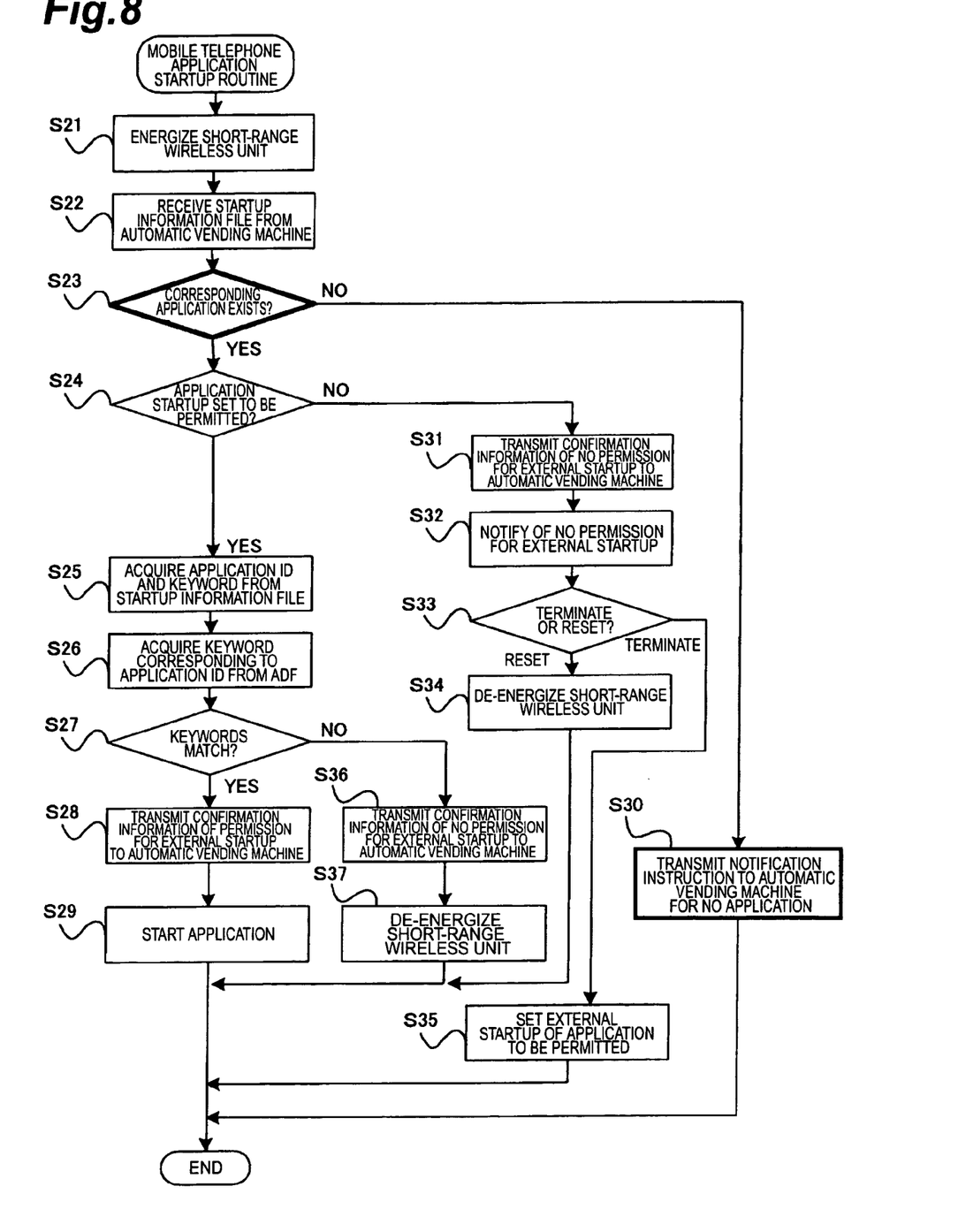
FIG. 8 is a flowchart describing the mobile telephone application software startup routine according to the second embodiment.

The mobile telephone application startup routine according to the second embodiment will next be described with reference to FIG. 8. In addition, the steps comprising the application software startup method pertaining to the present invention will be described. The present mobile telephone application startup routine is also similar to the mobile telephone application startup routine (see FIG. 6) described in detail in the first embodiment. More specifically, S21–S22, S24–29, S31–34, S35, and S36–37 in FIG. 8 correspond to S4–S5, S6–S11, S12–S15, S3, and S16–S17 in FIG. 6.

S23 and S30 (routines enclosed by thick lines in FIG. 8), which are routines specific to the present embodiment, are described hereafter. Specifically, the control unit 2 in S23 refers to the startup information file 171 received in S22 and evaluates whether or not an application ID for application software corresponding to the automatic vending machine 11 is stored in the ADF storage area 61. When an application ID that matches "AP003" is detected as a result of this evaluation (S23; YES), the mobile telephone 1 determines that the aforementioned application software has been stored, and proceeds to S24 and subsequent routines.

In contrast, when an application ID that matches "AP003" is not detected as a result of the evaluation in S23 (S23; NO), the mobile telephone 1 determines that the aforementioned application software has not been stored, and proceeds to the routine in S30.

In S30, the control unit 2 transmits instructions (notification instructions) for issuing notification that the aforementioned application software is not stored in the mobile telephone 1 to the automatic vending machine 11 by means of the short-range wireless unit 8. The mobile telephone 1 may at this time be configured so as to notify the user that the aforementioned application software is not stored in the mobile telephone 1 by means of the display 5 or voice processor 9.

Figure 9:
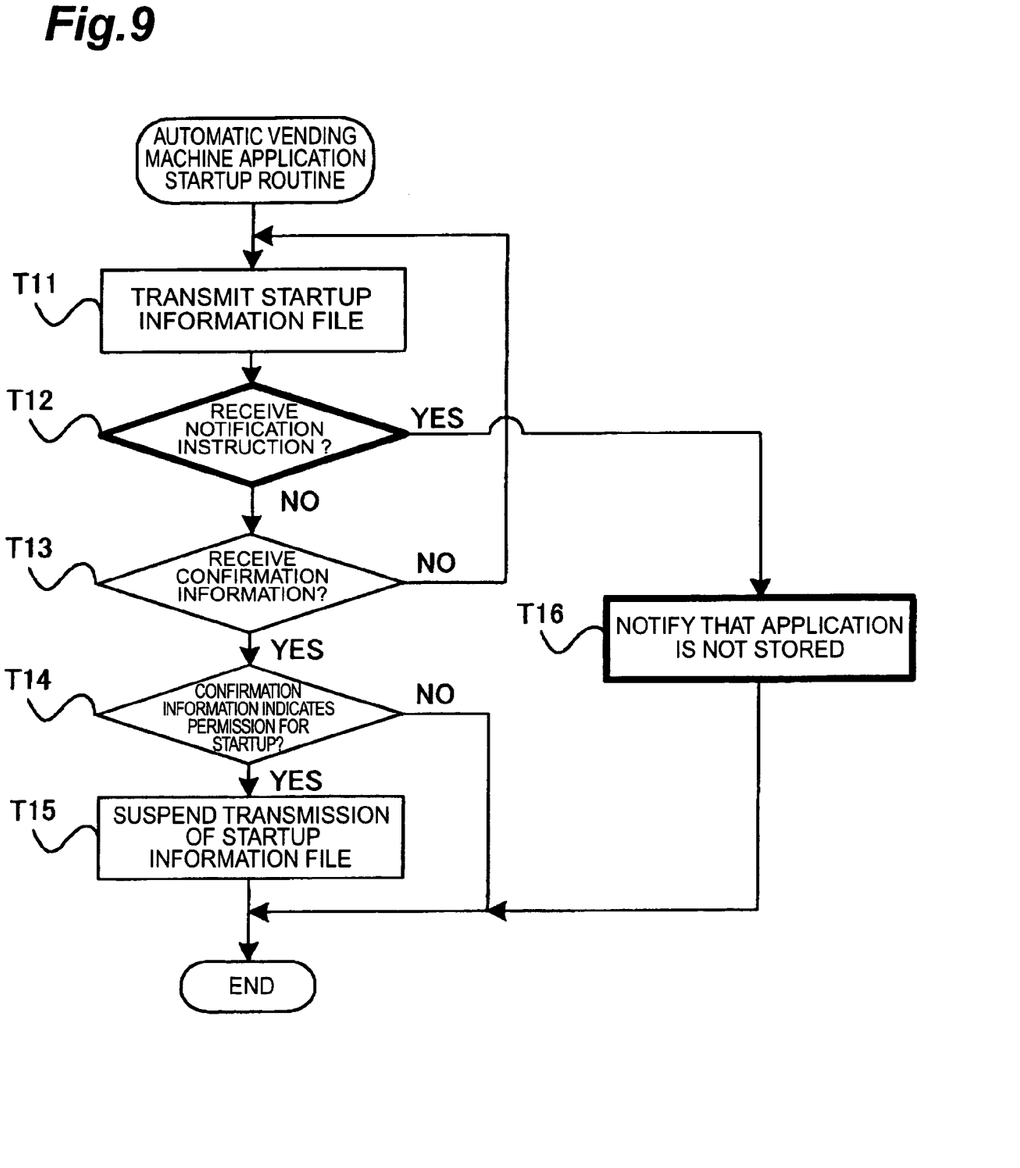
FIG. 9 is a flowchart describing the automatic vending machine application software startup routine according to the second embodiment.

The automatic vending machine application startup routine according to the second embodiment will next be described with reference to FIG. 9. The present automatic vending machine application startup routine is also similar to the automatic vending machine application startup routine (see FIG. 7) described in detail in the first embodiment. More specifically, T11 and T13–T15 in FIG. 9 correspond to T1 and T2–T4 in FIG. 7.

T12 and T16 (routines enclosed by thick lines in FIG. 9), which are routines specific to the present embodiment, are described hereafter. Specifically, the automatic vending machine 11 in T12 stands by to receive the aforementioned notification instruction and proceeds to the routine of T16 as soon as the notification instructions transmitted from the mobile telephone 1 in S30 of FIG. 8 are received by means of the short-range wireless unit 15 (T12; YES). In contrast, the automatic vending machine 11 proceeds to T14 and subsequent routines when authentication information is received before the notification instructions are received (T13; YES).

In T16, the automatic vending machine 11 issues notification that application software corresponding to the automatic vending machine 11 is not stored in the application storage area 62 of the mobile telephone 1. The method of notification is arbitrary, and examples thereof may include a text display on the display 14 (see FIGS. 10A and 10B), a specific sound, or a blinking light.

The mobile telephone 1 can download non-stored application software from the aforementioned application providing server 21, but may also be configured to acquire the same from the automatic vending machine 11. Designating the desired application software may be accomplished by the mobile telephone 1 transmitting a URL that is directly input by the user, or by reading the authentication information of the application software by means of a barcode.

Figure 10A:
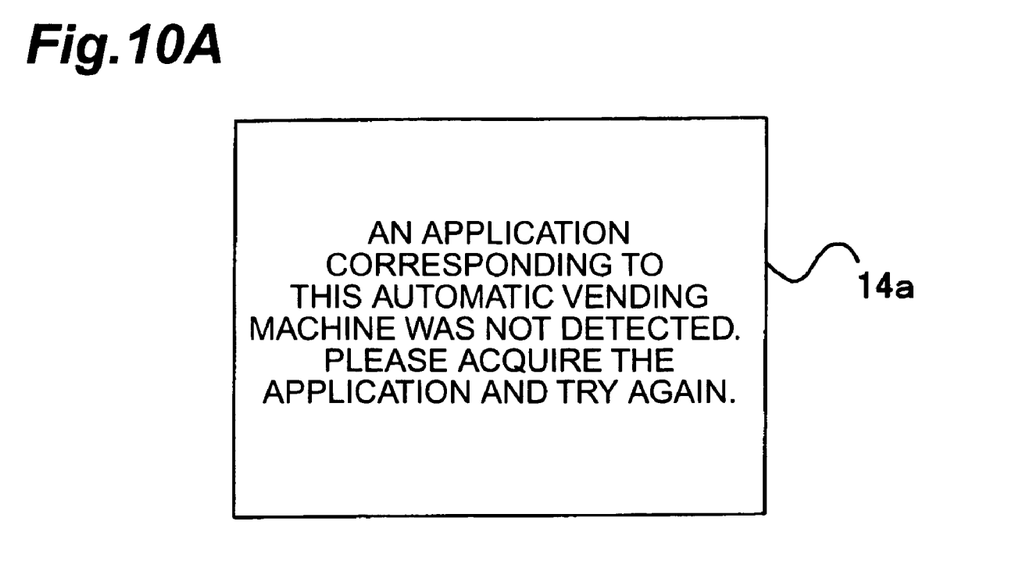
FIG. 10A is a diagram depicting an example of screen display data showing that no application exists in the mobile telephone.
Figure 10B:
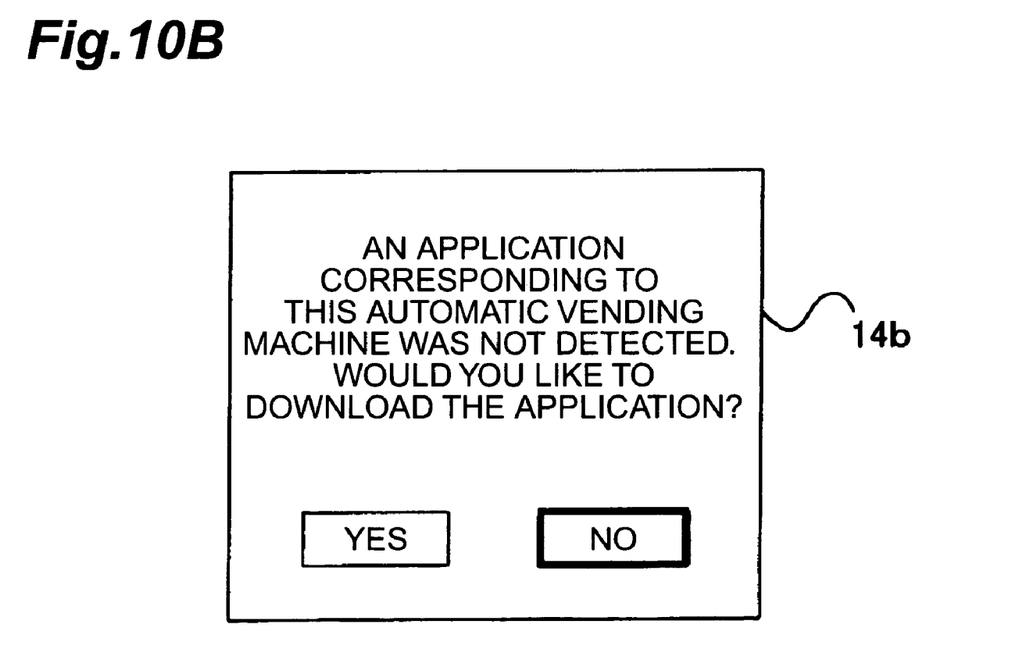
FIG. 10B is a diagram depicting an additional example of screen display data showing that no application exists in the mobile telephone.

A text message 14a similar to that shown in FIG. 10A is displayed on the display 14 in T16 when the automatic vending machine 11 is capable of providing application software. A text message 14b similar to that shown in FIG. 10B is also displayed on the display 14 in T16 when the automatic vending machine 11 is not capable of providing application software.

As heretofore described, it was assumed for the application starting system 100 according to the second embodiment that the mobile telephone 1 did not contain the application software needed for use by the automatic vending machine 11, regardless of being within the wireless communication range of the automatic vending machine 11. In this case, the user of the mobile telephone 1 could easily recognize that application software was not stored, by means of the automatic vending machine 11 issuing notification to this effect according to instructions from the mobile telephone 1. As a result, it becomes possible to proceed to the next action (an application software download, or the like) easily and quickly.

In addition, the aspects described in the present embodiment represent a preferred example of the application startup system pertaining to the present invention, and are not limited as such. For example, the aforementioned embodiments were described with reference to a mobile telephone as a—mobile communication terminal, but another information device capable of wireless communication, such as a PHS (Personal Handyphone System) or a PDA (Personal Digital Assistant), may also be used.

Also, an automatic vending machine was used as an example of an application software starting device in the present embodiment, but this may also consist of a register (including a POS (Point-Of-Sale) terminal), kiosk terminal, game machine, karaoke terminal, another mobile phone, or the like. Furthermore, the application software may be application software for purchasing or procuring goods; application software for acquiring or transmitting coupons, electronic money, or electronic tickets; application software for transmitting and receiving various types of information; any other type of software.

INDUSTRIAL APPLICABILITY

By means of the present invention, a mobile communication terminal receives identification information for application software from an application software starting device and automatically starts application software that corresponds to that identification information. Consequently, the need is eliminated for the user of the mobile communication terminal to manually select the application software used. As a result, the desired application software can be executed easily and quickly.

The invention claimed is:

1. A mobile communication terminal for communicating with an application software starting device, said mobile communication terminal comprising:
    storing means for storing application software in association with identification information;
    receiving means for receiving identification information transmitted from the application software starting device; and
    starting means for retrieving from the storing means and starting application software that corresponds to identification information received by the receiving means characterized in that the storing means stores the authentication information used for the external startup of the application software in association with identification information for the application software;
    the receiving means receives authentication information transmitted from the application software starting device; and
    the starting means retrieves from the storing means and starts application software that corresponds to identification information received by the receiving means when it is determined by the authentication mechanism that there is identity between the authentication information stored in the storing means and the authentication information received by the receiving means.

2. The mobile communication terminal according to claim 1, characterized in that the storing means stores the authentication information in an invisible state.

3. The mobile communication terminal according to claim 1, characterized in further comprising setting means for setting the external startup of the application software to be permitted or not permitted; and
    characterized in that the starting means retrieves from the storing means and starts application software that corresponds to identification information received by the receiving means when external startup of the application software is set to be permitted by the setting means.

4. The mobile communication terminal according to claim 1, characterized in further comprising application software receiving means for receiving the identification information and the application software from a server device; and
    characterized in that the storing means stores, in association with application software, the identification information received by the application software receiving means.

5. An application software starting device for communicating with the mobile communication terminal according to claim 1, said application software starting device in comprising:
    identification information storing means for storing identification information for application software executable by the mobile communication terminal; and
    transmitting means for transmitting identification information stored in the identification information storing means to the mobile communication terminal.

6. The application software starting device according to claim 5, further comprising notifying means for issuing notification when it is detected that the application software has not been stored in the storing means of the mobile communication terminal.

7. An application software starting system, characterized in comprising the mobile communication terminal according to claim 1 and an application software starting device, so that communication is carried out between the mobile communication terminal and the application software starting device.

8. A mobile communication terminal for communicating with an application software starting device, said mobile communication terminal comprising:
    storing means for storing application software in association with identification information;
    receiving means for receiving identification information transmitted from the application software starting device; and
    starting means for retrieving from the storing means and starting application software that corresponds to identification information received by the receiving means characterized in further comprising setting means for setting the external startup of the application software to be permitted or not permitted; and
    characterized in that the starting means retrieves from the storing means and starts application software that corresponds to identification information received by the receiving means when external startup of the application software is set to be permitted by the setting means, and the terminal further comprises, notifying means for notifying the user of the mobile communication terminal that external startup of the application software has been set to be not permitted in the case in which external startup of the application software is set to be not permitted, when identification information is received by the receiving means.

9. A mobile communication terminal for communicating with an application software starting device, said mobile communication terminal comprising:

storing means for storing application software in association with identification information;

receiving means for receiving identification information transmitted from the application software starting device; and starting means for retrieving from the storing means and starting application software that corresponds to identification information received by the receiving means identification information storing means for storing identification information for application software executable by the mobile communication terminal; and transmitting means for transmitting identification information stored in the identification information storing means to the mobile communication terminal characterized in that the identification information storing means stores authentication information in association with the identification information; and the transmitting means transmits authentication information stored in the identification information storing means to the mobile communication terminal.

10. An application software starting method in a mobile communication terminal for communicating with an application software starting device, said application software starting method comprising:

a storing step in which the mobile communication terminal stores application software in association with identification information in storing means;

a transmitting step in which the application software starting device transmits identification information for application software relating to the application software starting device to the mobile communication terminal;

a receiving step in which the mobile communication terminal receives the identification information transmitted in the transmitting step; and a starting step in which the mobile communication terminal retrieves from the storing means and starts application software that corresponds to identification information received in the receiving step, characterized in that authentication information used in the startup of the application software is stored in the storing means in association with identification information for application software in the storing step;

authentication information is transmitted to the mobile communication terminal in the transmitting step;

authentication information transmitted in the transmitting step is received in the receiving step;

a determining step is further provided for determining the identity of authentication information stored in the storing step and authentication information received in the receiving step; and application software that corresponds to the identification information received in the receiving step is retrieved from the storing means and started in the starting step when it is determined in the determining step that the authentication information stored in the storing step is identical to the authentication information received in the receiving step.

11. The application software starting method according to claim 10, characterized in that the authentication information is stored in the storing means in an invisible state in the storing step.

12. The application software starting method according to claim 10, characterized in further comprising a setting step in which the mobile communication terminal sets the external startup of application software to be permitted or not permitted; and application software that corresponds to identification information received in the receiving step is retrieved from the storing means and started in the starting step when external startup of the application software is set to be permitted in the setting step.

13. The application software starting method according to claim 12, characterized in further comprising a notifying step in which the mobile communication terminal notifies the user that external startup of the application software has been set to be not permitted in the case in which external startup of the application software is set to be not permitted, when identification information is received in the receiving step.

14. The application software starting method according to claim 10, characterized in further comprising an application software receiving step in which the mobile communication terminal receives the identification information and the application software from a server device; and the identification information and application software received in the application software receiving step are stored in association with each other in the storing step.

* * * * *